United States Patent [19]

Buckley

[11] Patent Number: 4,923,040

[45] Date of Patent: May 8, 1990

[54] HIGH TORQUE BRAKE/LOCK DIFFERENTIAL WITH EQUAL TORQUE SPLIT CAPABILITY

[75] Inventor: James A. V. Buckley, Whitefish Bay, Wis.

[73] Assignee: Hayes Industrial Brake, Inc., Mequon, Wis.

[21] Appl. No.: 248,803

[22] Filed: Sep. 23, 1988

[51] Int. Cl.⁵ ............................................. F16D 67/02
[52] U.S. Cl. ............................... 192/18 R; 192/93 A; 192/111 A
[58] Field of Search .............. 192/18 R, 93 A, 111 A, 192/18 A, 18 B

[56] References Cited

U.S. PATENT DOCUMENTS

| | | | |
|---|---|---|---|
| 2,786,560 | 3/1957 | Ishoy | 192/18 R |
| 3,680,670 | 8/1972 | Hansen | 192/18 R |
| 4,352,266 | 10/1982 | Lloyd et al. | 192/18 R X |
| 4,377,224 | 3/1983 | Takata et al. | 192/18 R |
| 4,787,493 | 11/1988 | Ohsono et al. | 192/111 A X |

FOREIGN PATENT DOCUMENTS 826391 1/1952 Fed. Rep. of Germany .... 192/18 R

Primary Examiner—Rodney H. Bonck
Attorney, Agent, or Firm—Foley & Lardner

[57] ABSTRACT

A high torque brake/lock differential for connecting a first shaft to a second independent shaft so that the shafts are either prevented from rotating or rotated at the same speed. The differential drive system includes a drive member mounted on one of the shafts, a clutch plate assembly mounted on the other shaft for axial motion into engagement with the drive member. The differential brake system including a frame fixedly mounted with respect to the shafts and a brake assembly mounted on the frame for connecting the shafts to the frame. The brake assembly and clutch assembly each including a set of plates and a set of discs which are selectively actuated by an actuator plate mounted on the frame. The actuator plate is positioned to move a thrust bearing into engagement with the clutch assembly in one direction of motion and a brake ring into engagement with the brake assembly in the other direction of motion. A compensating assembly is provided for compensating for wear of the clutch plate assembly.

10 Claims, 2 Drawing Sheets

HIGH TORQUE BRAKE/LOCK DIFFERENTIAL WITH EQUAL TORQUE SPLIT CAPABILITY

BACKGROUND OF THE INVENTION

1. Related Application

The present invention is an improvement over U.S. application Ser. No. 07/136,824 filed Dec. 22, 1987, and now U.S. Pat. No. 4,878,567, entitled "Brake/Locking Differential" which is assigned to the same assignee.

2. Field of the Invention

The present invention relates to a brake/lock differential for a hydrostatic transaxle drive assembly in which each wheel has a separate hydraulic drive motor. The brake/lock differential is used to provide power to both wheels if one wheel loses traction as well as to apply brake pressure to both wheels at the same time. The invention is more particularly related to a high torque brake/lock differential for heavy duty all terrain vehicles (ATV) and lawn and garden tractors.

3. Description of the Prior Art

The brake/locking differential described in the above identified application provides the brake/lock function by the engagement of a single drive plate mounted on one shaft with a clutch plate or brake plate mounted on the other shaft. The differential being selectively operated in the drive mode by connecting the drive plate to the clutch plate so the shafts operate at the same speeds or in the brake mode by connecting the drive plate to the brake plate to stop the rotation of the shafts. As the size of lawn and garden tractors has increased, the single brake plate and single clutch plate arrangement does not have the capability of providing sufficient frictional torque to handle this higher torque requirement without an increase in package size or thrust loads, both options of which are expensive.

SUMMARY OF THE INVENTION

A principal feature of the present invention is to increase both the brake and drive torque capability of a brake/lock differential. This has been accomplished by increasing the number of friction surfaces of the clutch assembly and the brake assembly while maintaining the same overall size of the package.

A further feature of the present invention is the ability to provide equal torque split between the brake assembly and the drive member so that equal torque is applied to each wheel in the brake mode.

Other principal features and advantages of the invention will become apparent to those skilled in the art upon review of the following detailed description, claims and drawings.

Figure 1:
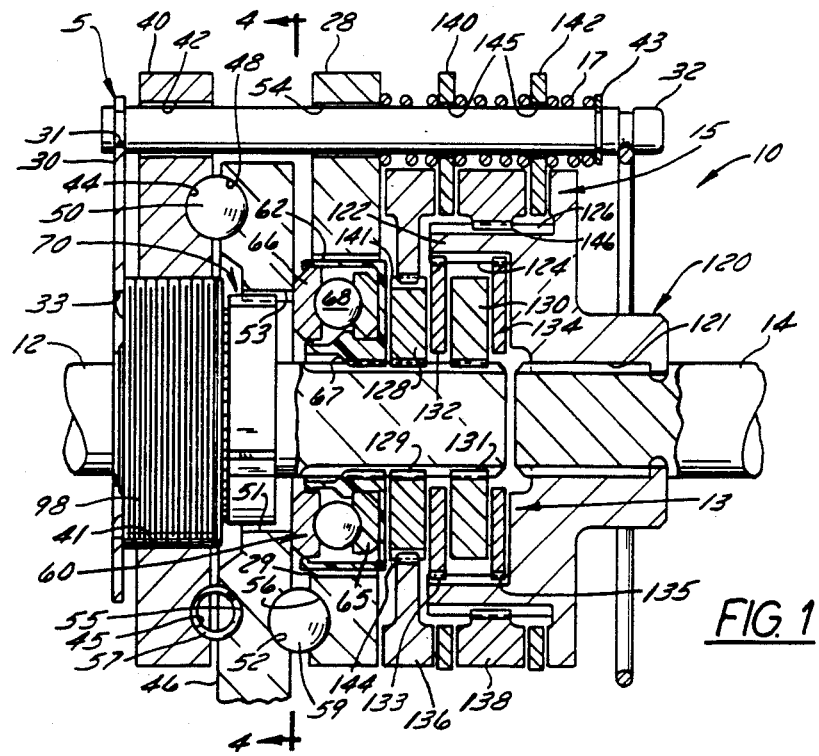
FIG. 1 is a side elevation view partly in section of the high torque brake/lock differential of the present invention shown in the neutral mode.

Although only one embodiment of the invention is explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood, that the phraseology and terminology used herein is for the purpose of description and should not be regarded as limiting.

DETAILED DESCRIPTION OF THE PREFERRED EXEMPLARY EMBODIMENT

The high torque brake/lock differential 10 as seen in the drawings is used to interconnect the wheel axles for a vehicle through a pair of auxiliary shafts 12 and 14. The auxiliary shafts 12 and 14 are connected to the wheel axles by means of gear assemblies as shown in application 07/136,824. In the normal mode of operation the auxiliary shafts 12 and 14 rotate independently with the corresponding wheel axle. The high torque brake/lock differential 10 is used, in the lock mode, to interconnect and lock the shafts 12 and 14 together so that they both rotate at the same speed thus providing equal speed to both wheel axles. In the brake mode, the auxiliary shafts 12 and 14 are coupled to a fixed frame 5 to prevent rotation of the shafts 12 and 14 as well as the corresponding wheel axle.

Figure 2:
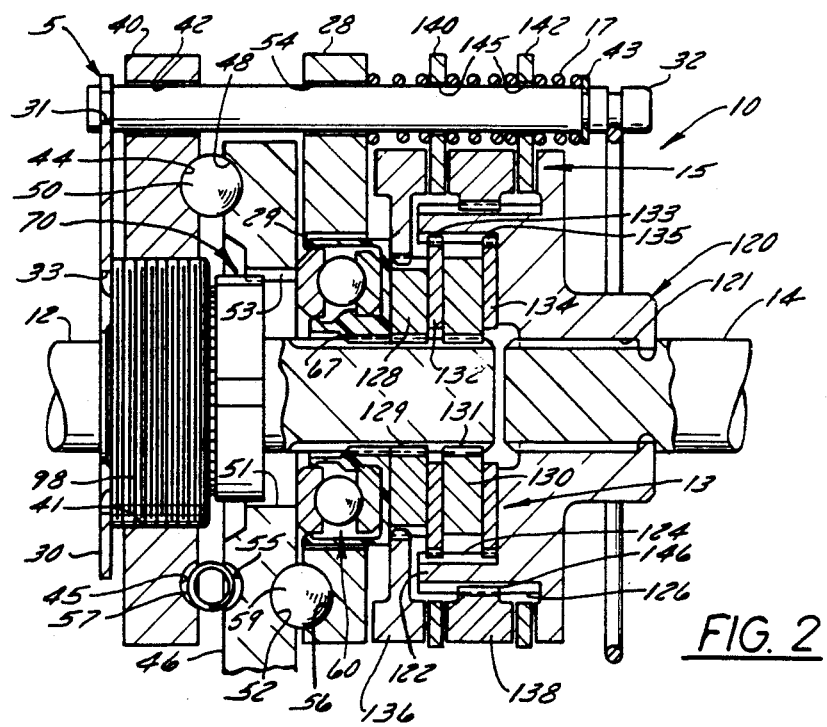
FIG. 2 is a side elevation view similar to FIG. 1 showing the brake/lock differential in the drive mode.
Figure 3:
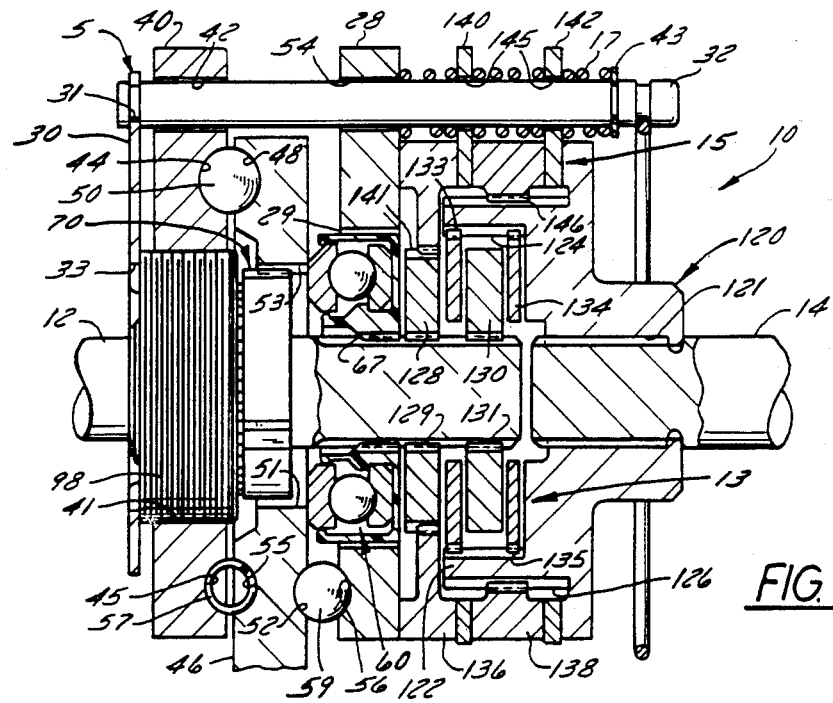
FIG. 3 is a side elevation view similar to FIG. 1 showing the brake/lock differential in the brake mode.

The differential 10, as shown in FIGS. 1, 2 and 3, generally includes the fixed frame 5 which is formed from a triangular base or plate 30 which is secured to the vehicle and includes a number of posts 32 mounted in slots 31 provided on each corner of the triangular plate 30. The center of the plate 30 is recessed to form an opening 33. The shaft 12 as shown extends through opening 33.

A cam plate 40 and a brake ring 28 are mounted on the posts 32 in a parallel relation to the frame plate 30 and in axial alignment with shaft 12. An actuator plate 46 is positioned between the plates 40 and 28 and is mounted for pivotal and axial motion with respect to shaft 12.

A drive member 120 having a splined bore 121 is mounted on the splined end of shaft 14 and is secured thereto so that the member 120 rotates with the shaft 14. The member 120 includes a hub 122 having an internal splined bore 124 and an externally splined surface 126.

Means are provided on the shaft 12 for operatively connecting the shaft 12 to the drive member 120 on shaft 14 so that the shafts 12 and 14 rotate at the same speed. Such means is in the form of a clutch assembly 13 which includes a pair of clutch plates 128 and 130 and a pair of clutch discs 132 and 134. The clutch plates 128 and 130 each have a splined opening 129 and 131, respectively, and are mounted on the splined end of shaft 12. The clutch plate 128 is provided with a splined periphery 141. The clutch discs 132 and 134 each have a splined peripheral surface 133 and 135, respectively, and are mounted for axial movement in the splined bore 124 of the drive member 120.

The clutch discs 132 and 134 are alternately arranged with respect to clutch plates 128 and 130 so that the disc 132 will be squeezed between plate 128 and plate 130 and disc 134 will be squeezed between plate 130 and drive member 120. The three friction surfaces between the plate 128 and plate 130 with the discs 132 and 134 and drive member 120 provides three times the frictional torque between shafts 12 and 14 than of the single friction face type. The torque can be increased further by adding additional plates however, heavier shafting would be required.

Means are provided for operatively connecting the shaft 12 and the drive member 120 to the rods 32 on the fixed frames so that the shafts 12 and 14 cannot rotate. Such means is in the form of a brake assembly 15 which includes a pair of brake plates 136 and 138 and a pair of brake discs 140 and 142. The brake plate 136 includes a splined bore 144 which matingly engages the splined periphery 141 of clutch plate 128. The brake plate 138 includes a splined bore 146 which matingly engages the externally splined surface 126 on hub 122. The brake discs 140 and 142 each include a plurality of openings 145 corresponding to the posts 32 so that the brake discs are free to move axially on the posts 32. The brake plates 136 and 138 are alternately arranged with respect to the brake discs 140 and 142 so that the disc 140 will be squeezed between the brake plates 136 and 138 and disc 142 will be squeezed between plate 138 and the drive member 120.

Equal torque split to the wheels is provided by means of a bearing material applied to the brake disc 142 and the drive member 120. A material such as an ultra-high molecular weight polyethylene or the like. This will reduce the frictional torque between disc 142 and drive member 120. Shaft 12 will then be braked by the frictional engagement of plate 136 with discs 28 and 140. Shaft 14 will be braked by the frictional engagement of plate 138 with discs 140 and 142.

Means are provided for moving the clutch plates 128 and 130 and clutch discs 132 and 134 into engagement with the drive member 120 to place the shafts 12 and 14 in the drive mode as shown in FIG. 2. Such means is in the form of a thrust bearing 60 mounted for axial movement on the splined end of shaft 12. The thrust bearing 60 being moved by the pivotal motion of the actuator plate 46 with respect to the cam plate 40. The actuator plate 46 moves axially relative to the cam plate 40 so that the actuator plate 46 and thrust bearing 60 move axially with respect to the shaft 12 to move the clutch plates 128 and 130 and clutch discs 132 and 134 into frictional engagement with each other and with the drive member 120 on shaft 14.

Figure 4:
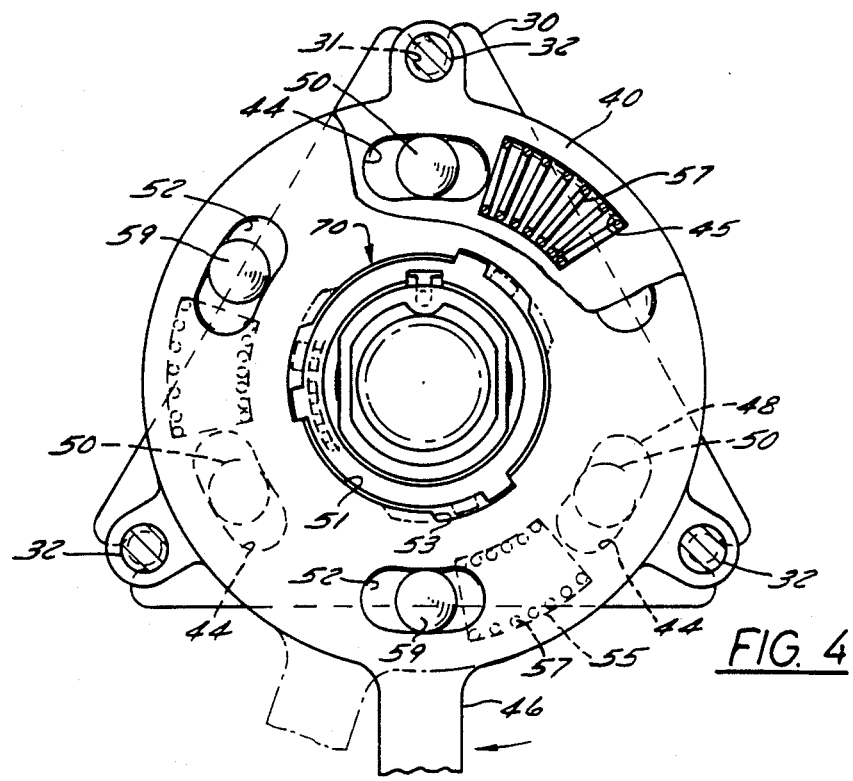
FIG. 4 is an end view taken on line 4—4 of FIG. 1 showing the brake side of the actuator plate partly broken away to show the cam plate.

In this regard, and referring to FIGS. 2 and 4, the cam plate 40 includes a threaded center opening 41 and a number of holes 42 corresponding to the number of posts 32. The cam plate 40 is screwed onto a threaded tube 98 which is seated on the plate 30 with the posts 32 passing through holes 42 and the shaft 12 passing through the threaded tube 98. The cam plate 40 includes three ramps 44 and three arcuate slots 45. The actuator plate 46 includes a center opening 51 and three equally spaced slots 53 around the opening 51. The actuator plate 46 includes three ramps 48 corresponding to ramps 44 in cam plate 40 and three arcuate slots 55 corresponding to slots 45 in cam plate 40. Three ramps 52 are also provided on the opposite side of the actuator plate 46. The actuator plate 46 is positioned next to the cam plate 40 with the ramps 48 and slots 55 in the actuator plate located opposite the ramps 44 and slots 45 in the cam plate 40.

The actuator plate 46 is moved away from the cam plate 40 by means of ball bearings 50 which are placed between each set of opposing ramps 44 and 48. The ramps are arranged so that the actuator plate 46 will be moved away from the cam plate 40 by the ball bearings 50 rolling up the ramps 44 and 48. The actuator plate 46 will move axially to the right as seen in FIG. 2. The actuator plate 46 is biased to the neutral position by means of compression springs 57 positioned in slots 45 in cam plate 40 and in slots 55 in actuator plate 46. The operation of the actuator plate and the movement of the balls 50 in the plates 40, 46 is further described in the co-pending application serial No. 07/136,824 as noted above.

The thrust bearing 60 is also mounted on the splined end of shaft 12 between the actuator plate 46 and the clutch plate 128. The thrust bearing 60, as shown in FIG. 2, includes a housing 62 having a splined opening 67 corresponding to the spline on shaft 12. The housing 62 is mounted on splined shaft 15 in a position to move into engagement with the clutch plate 128. A ball bearing assembly is provided in the housing 62 which includes an inner bearing ring 65, an outer bearing ring 66 and a number of ball bearings 68 positioned in the bearing rings 65 and 66, respectively. The bearing ring 66 is engaged by the axial motion of the actuator plate 46 forcing the housing 62 into engagement with the clutch plate 128. When the actuator plate 46 moves to the right, the thrust bearing 60 will be pushed against the clutch plate 128 forcing the clutch plates 128 and 130 into engagement with discs 132 and 134 to move the disc 134 into engagement with the drive member 120. The housing 62 of the bearing assembly 60 will rotate with the clutch plate 128 while the outer ring 66 will remain fixed with respect to the actuator plate 46. On engagement of the clutch disc 134 with the drive member 120, the two friction plates 128, 130 and friction discs 132, 134 will be locked together so that the axles 12 and 14 rotate at the same speed.

Brake means is also provided for preventing the rotation of the shafts 12 and 14. Such means is in the form of a brake ring 28 positioned between the actuator plate 46 and the brake plate 136. The brake ring 28 is also provided with three ramps 56, a center opening 29 and three openings 54 in the outer periphery. The brake ring 28 is mounted on the posts 32 in a parallel relation to the actuator plate 46 with the post 32 extending through the openings 54 and the bearing 60 centered in opening 29. The brake ring 28 is biased by means of a spring 17 on each post 32 toward the actuator plate 46. The spring 17 being retained on the post 32 by retainer rings 43.

The actuator plate 46 and brake ring 28 are separated by means of ball bearings 59 placed in each of the opposite sets of ramps 52 and 56. On rotation of the actuator plate 46 counterclockwise, the balls 59 will roll up ramps 52 and 56 moving the brake ring 28 away from the actuator plate 46 toward the drive member 120. On movement of the brake plate 28 toward the drive member 120, the brake plates 136 and 138 and drive member 120 will frictionally engage the brake discs 140 and 142 locking the drive member 120 and clutch plate 128 to the fixed frame 5.

The embodiments of the invention in which an exclusive property or privilege is claimed, are defined as follows:

1. A high torque brake/lock differential for selectively connecting two independently rotating shafts to rotate at the same speed or to stop the rotary motion of the shafts, said differential comprising:
   a pair of shafts mounted in an axially aligned relation,
   a frame mounted in a fixed relation to said shafts,
   a drive member mounted on one of said shafts,
   a set of clutch plates mounted for axial motion on the other of said shafts, a set of clutch discs mounted for axial motion in said drive member, said clutch plates being alternately arranged with respect to said clutch discs, actuating means for moving said clutch plates and clutch discs from a neutral position into frictional engagement with said drive member and with each other when the actuating means is moved in one direction whereby said shafts rotate as a unit and brake means for selectively connecting said drive member and said other shaft to said frame to prevent the rotation of said shafts when the actuating means is moved from said neutral position in the other direction.

2. The differential according to claim 1 wherein said brake means includes a number of brake discs mounted on said frame for axial motion with respect to said shafts, and a number of brake plates alternately arranged with respect to said brake discs, one of said brake plates being mounted for axial motion with respect to one of said clutch plates and another of said brake plates being mounted for axial motion with respect to said drive member, and said actuating means moving said brake plates and brake discs into frictional engagement with each other and with said drive member on movement in the other direction to prevent said shafts from rotating.

3. The differential according to claim 1 or 2 including means for compensating for wear between said clutch plates and clutch discs.

4. A high torque brake/lock differential assembly for selectively connecting two independently rotating shafts to rotate as a unit or to prevent rotation of the shafts, said assembly comprising:
   a pair of shafts mounted in an axially aligned relation,
   a drive member secured to the end of one of said shafts,
   a clutch assembly mounted for axial movement on the end of the other of said shafts and being axially aligned with said drive member,
   said clutch assembly including a number of plates mounted for axial movement on said other of said shafts,
   and a number of discs mounted for axial movement on said drive member and being alternately arranged with respect to said plates,
   a frame mounted in a fixed relation to said shafts,
   a cam plate mounted on said frame in axial alignment with the other of said shafts,
   an actuator plate mounted in a parallel relation to said cam plate for pivotal and axial motion on the other of said shafts,
   a thrust bearing mounted on the other of said shafts between said actuator plate and said clutch assembly,
   first means located between said cam plate and said actuator plate for moving said actuator plate from a neutral position away from said cam plate when said actuator plate is pivoted in one direction on said other of said shafts,
   said actuator plate moving said thrust bearing into engagement with said clutch discs to frictionally engage said drive member so that said shafts rotate at the same speeds and brake means for selectively connecting said shafts to said frame to prevent rotation of said shafts when said actuator plate is moved from the neutral position in the opposite direction.

5. The differential assembly according to claim 4 wherein said brake means comprises a brake assembly mounted on said frame between said actuator plate and said drive member, said brake assembly including a number of plates mounted for axial movement relative to said drive member and a number of discs mounted on said frame alternately arranged with said brake plates, a brake ring mounted on the other of said shafts and second means located between said actuator plate and said brake ring for moving said brake ring axially into engagement with said brake plates on pivotal motion of said actuator plate in the opposite direction whereby said brake plates will frictionally engage said brake discs to prevent said first and second shafts from rotating.

6. The assembly according to claim 5 wherein said second moving means comprises a number of ramps in said brake ring and a number of ramps in the opposite side of said actuator plate corresponding to the ramps in said brake ring, and a ball bearing positioned between each set of ramps.

7. The assembly according to claim 4 wherein said first moving means comprises a number of ramps in said cam plate and a number of ramps in one side of said actuator plate corresponding to said ramps in said cam plate and a ball bearing positioned in each corresponding set of ramps.

8. A brake/lock differential assembly for connecting a first shaft to a second shaft,
   said assembly comprising a frame, a drive member secured to the end of said first shaft,
   a clutch assembly for operatively connecting said drive member to said second shaft,
   said clutch assembly including a pair of clutch plates mounted on said second shaft and a pair of clutch discs mounted on said drive member,
   and means for selectively moving said clutch plates into frictional engagement with said clutch discs on said drive member whereby the first and second shaft will rotate at the same speed,
   said moving means including a thrust bearing assembly mounted on the second shaft for axial movement into engagement with said clutch assembly,
   an actuator plate mounted for rotary motion in said frame and axial motion into engagement with said thrust bearing,
   cam means for moving said actuator plate from a neutral position axially into engagement with said thrust bearing on rotary motion of said actuator plate in one direction with respect to the second shaft whereby said clutch assembly will be moved into engagement with said drive member to interlock the shafts and brake means for selectively connecting said frame to said shafts on rotation of said actuator plate in the opposite direction from said neutral position.

9. The differential according to claim 8 including means for compensating for wear of said clutch plates and clutch discs.

10. The differential according to claim 9 wherein said brake assembly includes a pair of brake discs mounted on said frame and a pair of brake plates alternately arranged on said shafts.

* * * * *